US012264960B2

United States Patent
Hino et al.

(10) Patent No.: US 12,264,960 B2
(45) Date of Patent: Apr. 1, 2025

(54) SENSOR SIGNAL PROCESSING APPARATUS AND SENSOR SIGNAL PROCESSING METHOD

(71) Applicant: NEC Corporation, Tokyo (JP)

(72) Inventors: Tomoyuki Hino, Tokyo (JP); Akihiro Tanaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 627 days.

(21) Appl. No.: 17/417,198

(22) PCT Filed: Mar. 5, 2019

(86) PCT No.: PCT/JP2019/008579
§ 371 (c)(1),
(2) Date: Jun. 22, 2021

(87) PCT Pub. No.: WO2020/178976
PCT Pub. Date: Sep. 10, 2020

(65) Prior Publication Data
US 2022/0057255 A1    Feb. 24, 2022

(51) Int. Cl.
*G01H 9/00* (2006.01)
*G01D 5/353* (2006.01)
*H04B 10/2537* (2013.01)

(52) U.S. Cl.
CPC ......... *G01H 9/004* (2013.01); *G01D 5/35358* (2013.01); *G01D 5/35361* (2013.01); *H04B 10/2537* (2013.01)

(58) Field of Classification Search
CPC . G01H 9/004; G01D 5/35361; H04B 10/2537
USPC .......................................................... 73/655
See application file for complete search history.

(56) References Cited

U.S. PATENT DOCUMENTS

2019/0025095 A1    1/2019    Steel et al.

FOREIGN PATENT DOCUMENTS

| CN | 111051832 A | * | 4/2020 | ......... G01D 5/35358 |
|----|-------------|---|--------|------------------------|
| JP | H11271028 A |   | 10/1999 | |
| JP | 2001507446 A | * | 6/2001 | ............. G01D 5/353 |
| JP | 3439109 B2  |   | 8/2003 | |
| JP | 2005321264 A |   | 11/2005 | |
| JP | 2005349892 A |   | 12/2005 | |

(Continued)

OTHER PUBLICATIONS

International Search Report for PCT Application No. PCT/JP2019/008579, mailed on Jun. 4, 2019.

(Continued)

*Primary Examiner* — John E Breene
*Assistant Examiner* — Rose M Miller
(74) *Attorney, Agent, or Firm* — Sughrue Mion, PLLC

(57) ABSTRACT

In optical fiber sensors, sensor signals obtained differ according to the circumstances of installation, in locations being observed, of optical fibers serving as sensors, and it is difficult to perform accurate measurements; therefore, a sensor signal processing apparatus according to the present invention includes variation calculation means for receiving a sensor signal based on scattered light of a light pulse propagating through an optical fiber, and calculating a variation of the sensor signal from a reference value; and normalization processing means for normalizing the variation within a predetermined time, and calculating a normalized variation.

9 Claims, 9 Drawing Sheets

(56) References Cited

FOREIGN PATENT DOCUMENTS

| | | |
|---|---|---|
| JP | 3733125 B2 | 1/2006 |
| JP | 2013185922 A | 9/2013 |
| JP | 2013205124 A | 10/2013 |

OTHER PUBLICATIONS

English translation of Written opinion for PCT Application No. PCT/JP2019/008579, mailed on Jun. 4, 2019.

* cited by examiner

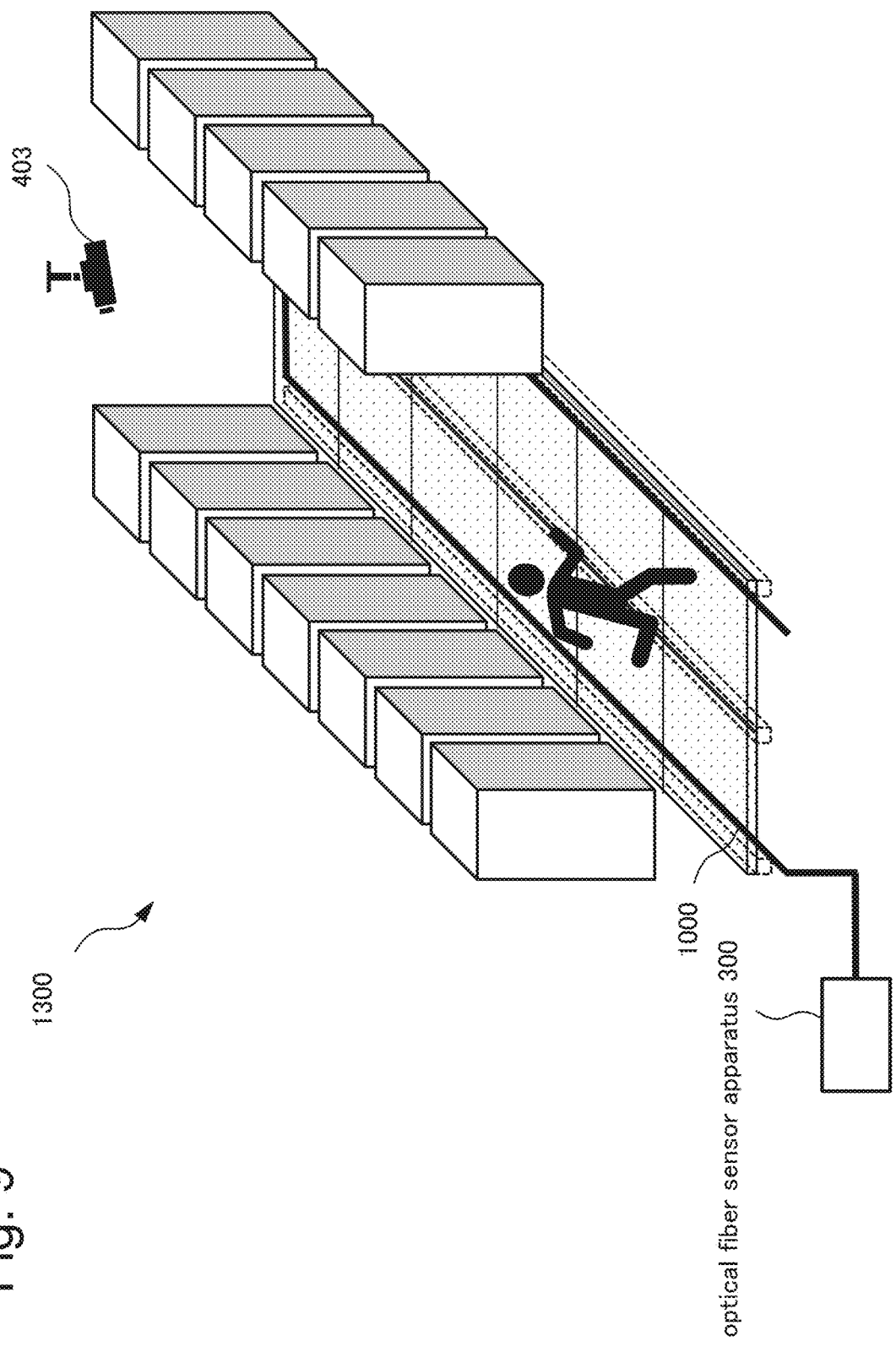

SENSOR SIGNAL PROCESSING APPARATUS AND SENSOR SIGNAL PROCESSING METHOD

This application is a National Stage Entry of PCT/JP2019/008579 filed on Mar. 5, 2019, the contents of all of which are incorporated herein by reference, in their entirety.

TECHNICAL FIELD

The present invention relates to a sensor signal processing apparatus and a sensor signal processing method, and particularly, relates to a sensor signal processing apparatus and a sensor signal processing method which are used in an optical fiber sensor.

BACKGROUND ART

An optical fiber sensor is widely introduced for use in maintaining a communication optical fiber, diagnosing an abnormality of an infrastructure, and the like.

When the optical fiber sensor is used for maintaining a communication optical fiber, an optical time domain reflectometry (OTDR) system is adopted. The OTDR system is a system of sending a light pulse from one end of an optical fiber and measuring an intensity change of backscattered light that returns in the optical fiber in a reverse direction to a direction where the light pulse is sent. When there is an abnormal loss at an optical fiber connection point such as an optical connector, a light intensity of the backscattered light increases at that place. Such an abnormal spot can be identified by calculating a propagation time from sending the light pulse till measuring the backscattered light.

When the optical fiber sensor is used for diagnosing an abnormality of an infrastructure, a Brillouin optical time domain reflectometry (BOTDR) system is adopted. As for the BOTDR system, a light pulse is sent from one end of an optical fiber as in the above-mentioned OTDR system, but backscattered light to be measured is different in type from the backscattered light in the OTDR system. In the BOTDR system, backscattered light called Brillouin scattered light is measured. The Brillouin scattered light has a property of causing a frequency shift when a distortion or the like is added to the optical fiber, and therefore, it can be determined whether a distortion is added to the fiber, by measuring an amount of the frequency shift.

As described above, the optical fiber sensor is widely applied for the purpose of detecting an abnormality at a connection point of the optical fiber and measuring a distortion added to the optical fiber.

PTL 1 (Japanese Unexamined Patent Application Publication No. 2013-185922) describes an example of an optical fiber sensor that detects a mechanical vibration added to the optical fiber and senses an abnormality such as an intruder or a breakage of a pipeline.

An optical fiber vibration sensor 1 described in PTL 1 includes an optical fiber 2, a light source 3 that emits pulse light, a light receiver 4, a coupler 5, a polarization beam splitter 6 and a polarization combiner 7which are provided between the coupler 5 and the light receiver 4, and a signal processing circuit 8. Herein, the optical fiber 2 is disposed as a sensor cable 9 along a structure (fence, pipeline, or the like) to be subjected to vibration sensing. The signal processing circuit 8 includes a first vibration detection unit 8a and a second vibration detection unit 8b. The first vibration detection unit 8a detects a light intensity of interference light from an output of the light receiver 4, and by a fluctuation of the light intensity of the interference light, senses a vibration added to the optical fiber 2. The second vibration detection unit 8b is configured to detect light intensities of two linear polarized beams and to sense a vibration, based on the light intensities of both of the linear polarized beams.

CITATION LIST

Patent Literature

[PTL 1] Japanese Unexamined Patent Application Publication No. 2013-185922

SUMMARY OF INVENTION

Technical Problem

In recent years, there have been innovations in an optical network technology, such as narrowing a line width of a laser spectrum, and advancing a coherent (property that waves interfere with each other) receiving system. Therefore, new uses have been being added also to an optical fiber sensing technology. Specifically, it has been made possible to measure a state change of a phase of light, whereby parameters detectable by an optical fiber sensor have been extended to environmental factors such as a vibration and a sound as well as existing factors of distortion and temperature.

A feature of the optical fiber sensor is continuity. Specifically, the optical fiber sensor is capable of acquiring a change of an environment at any position in a longitudinal direction of an optical fiber cable, and accordingly, is expected to be applied to new applications. For example, the optical fiber sensor is expected to acquire position information of a moving body and a degraded state of a structural matter by sensing a vibration, a sound, or the like by using an optical fiber cable already installed along a highway, a train railroad, or the like.

However, an installation state of the already installed optical fiber cable to the structural matter is various. Therefore, an intensity of a sensor signal being output from the optical fiber fluctuates to a large extent depending on the installation state. For example, sensor performance for sensing a vibration differs between "a place where the optical fiber cable is fixed to the structural matter" and "a place where the optical fiber cable is apart from the structural matter".

As described above, in the optical fiber sensor, there has been a problem that an acquired sensor signal differs depending on a situation where the optical fiber serving as a sensor is installed on an observation target, resulting in difficulty of accurate measurement.

An object of the present invention is to provide a sensor signal processing apparatus and a sensor signal processing method that solve the above-mentioned problem that in the optical fiber sensor, an acquired sensor signal differs depending on a situation where the optical fiber serving as a sensor is installed on an observation target, resulting in difficulty of accurate measurement.

Solution to Problem

A sensor signal processing apparatus according to the present invention includes variation calculation means for receiving a sensor signal based on scattered light of a light pulse propagating through an optical fiber, and calculating a variation of the sensor signal from a reference value; and normalization processing means for normalizing the variation within a predetermined time, and calculating a normalized variation.

A sensor signal processing method according to the present invention includes receiving a sensor signal based on scattered light of a light pulse propagating through an optical fiber, and calculating a variation of the sensor signal from a reference value; and normalizing the variation within a predetermined time, and calculating a normalized variation.

A computer-readable recording medium according to the present invention recording a program for causing a computer to function as variation calculation means for receiving a sensor signal based on scattered light of a light pulse propagating through an optical fiber, and calculating a variation of the sensor signal from a reference value; and normalization processing means for normalizing the variation within a predetermined time, and calculating a normalized variation.

Advantageous Effects of Invention

According to the sensor signal processing apparatus and the sensor signal processing method according to the present invention, in an optical fiber sensor, accurate measurement is enabled regardless of a situation where an optical fiber serving as a sensor is installed on an observation target.

BRIEF DESCRIPTION OF DRAWINGS

FIG. 9 is a diagram illustrating still another configuration of the monitoring system according to the fourth example embodiment of the present invention.

EXAMPLE EMBODIMENT

Example embodiments of the present invention will be described below with reference to the drawings.

First Example Embodiment

Figure 1:
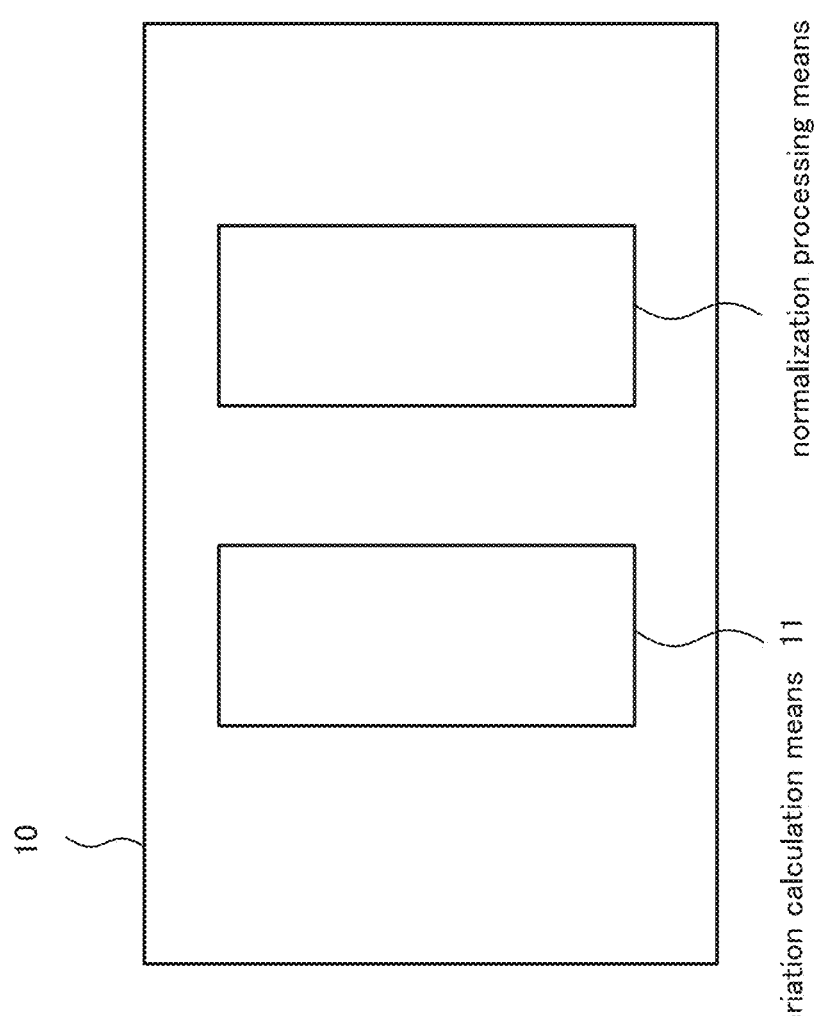
FIG. 1 is a block diagram illustrating a configuration of a sensor signal processing apparatus according to a first example embodiment of the present invention.

FIG. 1 is a block diagram illustrating a configuration of a sensor signal processing apparatus 10 according to a first example embodiment of the present invention. The sensor signal processing apparatus 10 includes a variation calculation means 11 and a normalization processing means 12.

The variation calculation means 11 receives a sensor signal based on scattered light of a light pulse that propagates through an optical fiber, and calculates a variation of the sensor signal from a reference value. The normalization processing means 12 normalizes the variation within a predetermined time, and calculates a normalized variation.

As described above, the sensor signal processing apparatus 10 according to the present example embodiment is configured to standardize the variation of the sensor signal from the reference value and to calculate a normalized variation. Therefore, by using the sensor signal processing apparatus 10 according to the present example embodiment, accurate measurement is enabled in an optical fiber sensor regardless of a situation where the optical fiber serving as a sensor is installed in an observation target.

Herein, the normalization processing means 12 can be configured to perform the normalization by dividing the variation by a maximum value of the variations within a predetermined time. The normalization processing means 12 may be configured to perform the normalization by dividing the variation by an average value of the variations within a predetermined time.

The sensor signal processing apparatus 10 may be configured to further include a occurrence region estimation means for estimating a region where an environmental change of the optical fiber occurs from a difference between a transmission time of the light pulse and a reception time of scattered light of the light pulse.

The sensor signal received by the variation calculation means 11 provided in the sensor signal processing apparatus 10 according to the present example embodiment can be a signal based on scattered light when the optical fiber is laid along a road. The sensor signal is not limited to the above, and may be a signal based on scattered light when the optical fiber is laid along a railroad. Further, the sensor signal may be a signal based on scattered light when the optical fiber is laid in a building.

Next, a sensor signal processing method according to the present example embodiment will be described.

In the sensor signal processing method according to the present example embodiment, first, a sensor signal based on scattered light of a light pulse that propagates through an optical fiber is received, and a variation of the sensor signal from a reference value is calculated. Then, the variation within a predetermined time is standardized, and a normalized variation is calculated.

The sensor signal processing method according to the present example embodiment may further include processing of estimating a region where an environmental change of the optical fiber occurs from a difference between a transmission time of the light pulse and a reception time of scattered light of the light pulse.

Herein, the calculating the above-mentioned normalized variation can be normalizing the variation by dividing the variation by a maximum value of the variations within a predetermined time. The calculating of the normalized variation can be normalizing the variation by dividing the variation by an average value of the variations within a predetermined time.

A computer may be caused to execute each of the above-mentioned steps. In other words, there can be used a program for causing a computer to function as a variation calculation means and a normalization processing means, and can be used a computer-readable recording medium that records the program. Herein, the variation calculation means receives a sensor signal based on scattered light of a light pulse that propagates through the optical fiber, and calculates a variation of the sensor signal from a reference value. The normalization processing means normalizes the variation within a predetermined time, and calculates a normalized variation.

As described above, according to the sensor signal processing apparatus 10, the sensor signal processing method, the program, and the computer-readable recording medium recording the program, of the present example embodiment, accurate measurement becomes possible in the optical fiber sensor regardless of the situation where the optical fiber serving as a sensor is installed in an observation target.

Second Example Embodiment

Figure 2:
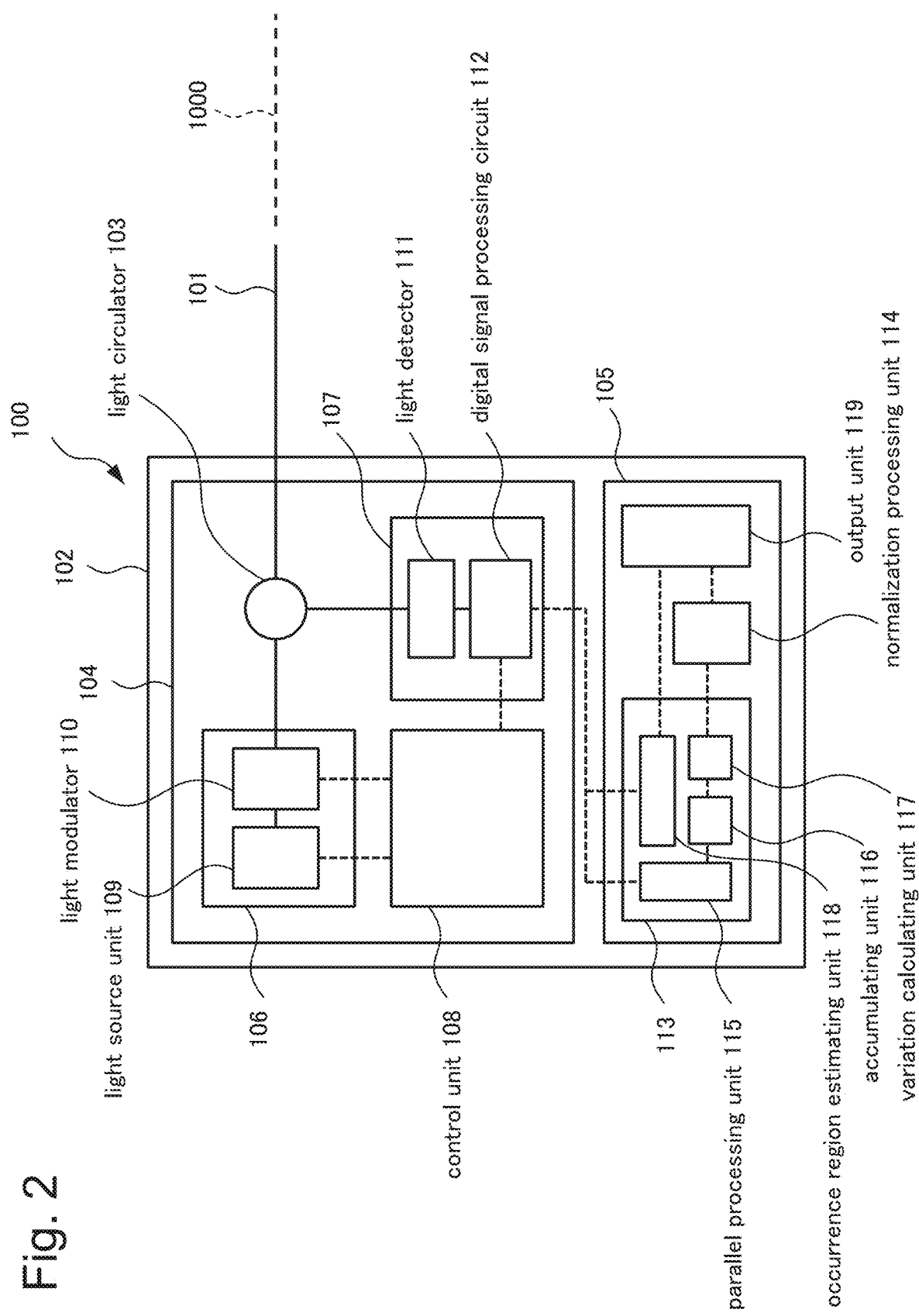
FIG. 2 is a block diagram illustrating a configuration of an optical fiber sensor apparatus according to a second example embodiment of the present invention.

Next, a second example embodiment of the present invention will be described. FIG. 2 illustrates a configuration of an optical fiber sensor apparatus 100 according to the present example embodiment.

The optical fiber sensor apparatus 100 is used by being connected to an optical fiber cable 1000 serving as a sensor installed in an observation target, and detects a change of an environment such as a distortion, a temperature, a vibration, and a sound in the observation target. Herein, the optical fiber cable 1000 has characteristics that an intensity and frequency of scattered light of light that propagates change due to the change of the environment such as a distortion, a temperature, a vibration, and a sound. As the optical fiber cable 1000, for example, a cable can be used, which uses a light-transmittable substance such as quartz glass and plastics formed into fibers, and adopts a two-layer structure composed of a core on a central portion and a cladding that covers a periphery of the core.

The optical fiber cable 1000 is connected to the observation target serving as a detection target of the change of the environment such as a distortion, a temperature, a vibration, and a sound, or is disposed along the observation target. For example, the optical fiber cable 1000 can be connected to a communication optical fiber serving as a detection target of an abnormal loss at a connection point, or can be disposed outside of a facility or the like which serves as a detection target of an abnormality. In the present example embodiment, a description will be given by taking, as an example, a case of sensing a vibration of a vehicle (moving body), which runs on a highway, by connecting the optical fiber sensor apparatus 100 to the communication-purpose optical fiber cable 1000 disposed along the highway.

The optical fiber sensor apparatus 100 includes an optical fiber 101 in which one end is connected to the optical fiber cable 1000 installed in the observation target, and includes a device body 102. Another end of the optical fiber 101 is connected to a light circulator 103 provided in the device body 102.

The device body 102 is composed of a sensor unit 104 that continuously senses a motion of the moving body, and an analysis unit 105 that analyzes data acquired by the sensor unit 104.

The sensor unit 104 includes the light circulator 103, a sending unit 106 that generates and sends a light pulse signal, a light receiving unit 107 that receives scattered light signal of the light pulse signal, and a control unit 108 that controls the sending unit 106 and the light receiving unit 107.

The sending unit 106 includes a light source unit 109 composed of a light emitting element and a drive circuit of the light emitting element, and includes a light modulator 110. As the light emitting element, a laser diode (LD) having a highly coherent narrow line width can be used. The drive circuit is a circuit that drives the light emitting element, and by control from the control unit 108, drives the light emitting element in such a way that a light pulse signal with a fixed cycle (pulse width) is output from the light source unit 109.

The light modulator 110 modulates the light pulse signal output from the light source unit 109. In other words, by using an audio-optical element, the light modulator 110 performs intensity modulation for a pulse-shaped optical carrier wave by a high frequency wave (for example, at several hundred megahertz).

By controlling the light source unit 109 and the light modulator 110, the control unit 108 can change a wavelength, frequency, intensity, phase, and the like of the light to be sent.

The light pulse signal modulated by the light modulator 110 is output to the optical fiber cable 1000 via the circulator 103 and the optical fiber 101. The circulator 103 causes the light pulse signal output from the light modulator 110 to enter the optical fiber 101, and outputs backscattered light of the light pulse signal by the optical fiber cable 1000 to a light detector 111 included in the light receiving unit 107, and the backscattered light has returned through the optical fiber 101.

The light receiving unit 107 receives the backscattered light. The light receiving unit 107 includes the light detector 111 and a digital signal processing circuit 112. The light detector 111 converts the received backscattered light into an analog electrical signal. For the light detector 111, for example, a photo detector (PD) can be used.

Herein, the backscattered light has a fixed pulse width, and therefore, pieces of the scattered light, which return to the light receiving unit 107 at the same time, interfere with each other, whereby the light intensity fluctuates. When the optical fiber cable 1000 receives the change of the environment such as a vibration at this time, the distortion of the optical fiber cable 1000 changes, and the phase of the high frequency wave formed by modulating the light pulse signal changes. Hence, a state of the interference between the pieces of scattered light in the light receiving unit 107 changes depending on the change of the environment such as a vibration received by the optical fiber cable 1000, whereby the variation of the light intensity changes.

The light detector 111 outputs the analog electrical signal to the digital signal processing circuit 112. The digital signal processing circuit 112 converts this analog electrical signal into a digital signal. For the digital signal processing circuit 112, for example, a semiconductor integrated circuit device can be used. The digital signal processing circuit 112 outputs the converted digital signal (sensor signal) to the analysis unit 105.

The control unit 108 individually controls the sending unit 106 that generates a light pulse signal and the light receiving unit 107 that receives scattered light by this light pulse signal. Herein, the control unit 108 controls the sending unit 106 and the light receiving unit 107 to be synchronized with each other. In other words, the control unit 108 synchronizes, with each other, sending timing when the sending unit 106 sends the light pulse signal and detection timing when the light receiving unit 107 detects the backscattered light. The control unit 108 controls a sampling interval in the light receiving unit 107 in such a way as to become shorter than the pulse width of the light pulse signal.

The analysis unit 105 analyzes the digital signal (sensor signal) acquired from the sensor unit 104. The analysis unit 105 includes a vibration detection unit 113 that determines a vibration from a state change of the received scattered light, a normalization processing unit (normalization processing means) 114 that suppresses a fluctuation of intensity of the sensor signal, the fluctuation depending on an installation state of the optical fiber cable 1000, and an output unit 119.

The vibration detection unit 113 includes a parallel processing unit 115, an accumulating unit 116, a variation calculating unit (variation calculation means) 117, and a occurrence region estimating unit (occurrence region estimation means) 118.

Herein, the normalization processing unit (normalization processing means) 114 and the variation calculating unit (variation calculation means) 117 constitute the sensor signal processing apparatus 10 according to the first example embodiment.

For each sampling time, the parallel processing unit 115 performs parallel processing for sensor signals achieved by being sampled at a specific frequency in the digital signal processing circuit 112. Herein, the sensor signal is a digital signal based on the backscattered light from the optical fiber cable 1000 by the light pulse signal. A cycle of the parallel processing in the parallel processing unit 115 is associated to a round trip time since the light pulse signal reaches a longest measuring point of the optical fiber cable 1000 until the light pulse signal returns. In other words, the time since the light pulse signal reaches the longest measuring point of the optical fiber cable 1000 after being sent from the sending unit 106 until the backscattered light returns from the longest measuring point to the light receiving unit 107 is a minimum cycle of the parallel processing. Hence, the sensor signals based on the backscattered light that returns from the same place of the optical fiber cable 1000 are always processed on the same processing surface in the parallel processing. The sensor signals of each sampling time, which are subjected to the parallel processing in the parallel processing unit 115, are output to the accumulating unit 116.

Within a preset period of time, the accumulating unit 116 accumulates the sensor signals based on the backscattered light subjected to the parallel processing in the parallel processing unit 115 for each sampling time. Then, the accumulating unit 116 outputs the sensor signals (accumulated data), which are accumulated for each sampling time, to the variation calculating unit 117.

The variation calculating unit 117 calculates variations (variation accumulated data) of the sensor signals (accumulated data) from the reference value, the sensor signals being accumulated in the accumulating unit 116 with respect to each sampling time. Then, the variation calculating unit 117 outputs the calculated variations of each sampling time to the normalization processing unit 114.

The normalization processing unit 114 normalizes the above-mentioned variations, i.e., the variations of each sampling time within a preset period of time. For example, the normalization can be performed by dividing each of the variations by a maximum value of the variations within a predetermined time. The normalization is not limited to this, and the normalization processing unit 114 may standardize the variation by dividing each of the variations by an average value of the variations within a predetermined time. The normalization processing unit 114 outputs, to the output unit 119, the variations which are standardized (i.e., the normalized variations).

The occurrence region estimating unit 118 estimates a region where an environmental change occurs in the observation target where the optical fiber cable 1000 is installed. Specifically, from a difference between the transmission time of the light pulse signal and the reception time of the backscattered light of the light pulse signal, the occurrence region estimating unit 118 estimates the region where the change of the environment of the optical fiber cable 1000 occurs.

The output unit 119 outputs information regarding the normalized variations which are acquired from the normalization processing unit 114, and information regarding the occurrence region which is acquired from the occurrence region estimating unit 118. The output unit 119 outputs the above-mentioned information in the form of image display, voice, printing, digital signals, and the like.

Next, a description will be given of a principle of fiber sensing by the optical fiber sensor apparatus 100.

When the light pulse signal is sent to the optical fiber cable 1000, then from all places in a longitudinal direction of the optical fiber cable 1000 through which the light pulse signal passes, weak backscattered light propagates in a reverse direction to a travel direction of the light pulse signal. The backscattered light has a variety of types, and in the present example embodiment, a description will be given of a case of sensing Rayleigh scattered light. The Rayleigh scattered light is scattered light having the same frequency component as the sent light pulse signal.

When the change of the environment such as a vibration and a sound occurs in the environment where the optical fiber cable 1000 is installed, and such an environmental change propagates to the optical fiber cable 1000, then there changes a state of backscattered light that returns from a place where this environmental change occurs. Specifically, there change an intensity of the backscattered light and a phase of a high frequency wave formed by modulating the light pulse signal serving as a source of the backscattered light. Hence, the changes of the intensity and the phase at this time are sensed, whereby it can be sensed that a change occurs in the environment where the optical fiber cable 1000 is installed. A time since the sending unit 106 sends the light pulse signal until the backscattered light in which the changes of the intensity and the phase are generated is observed is measured, whereby a position of the optical fiber cable 1000, at which the environmental change occurs, can be calculated. Thus, a place where the environmental change occurs can be specified.

Figure 3:
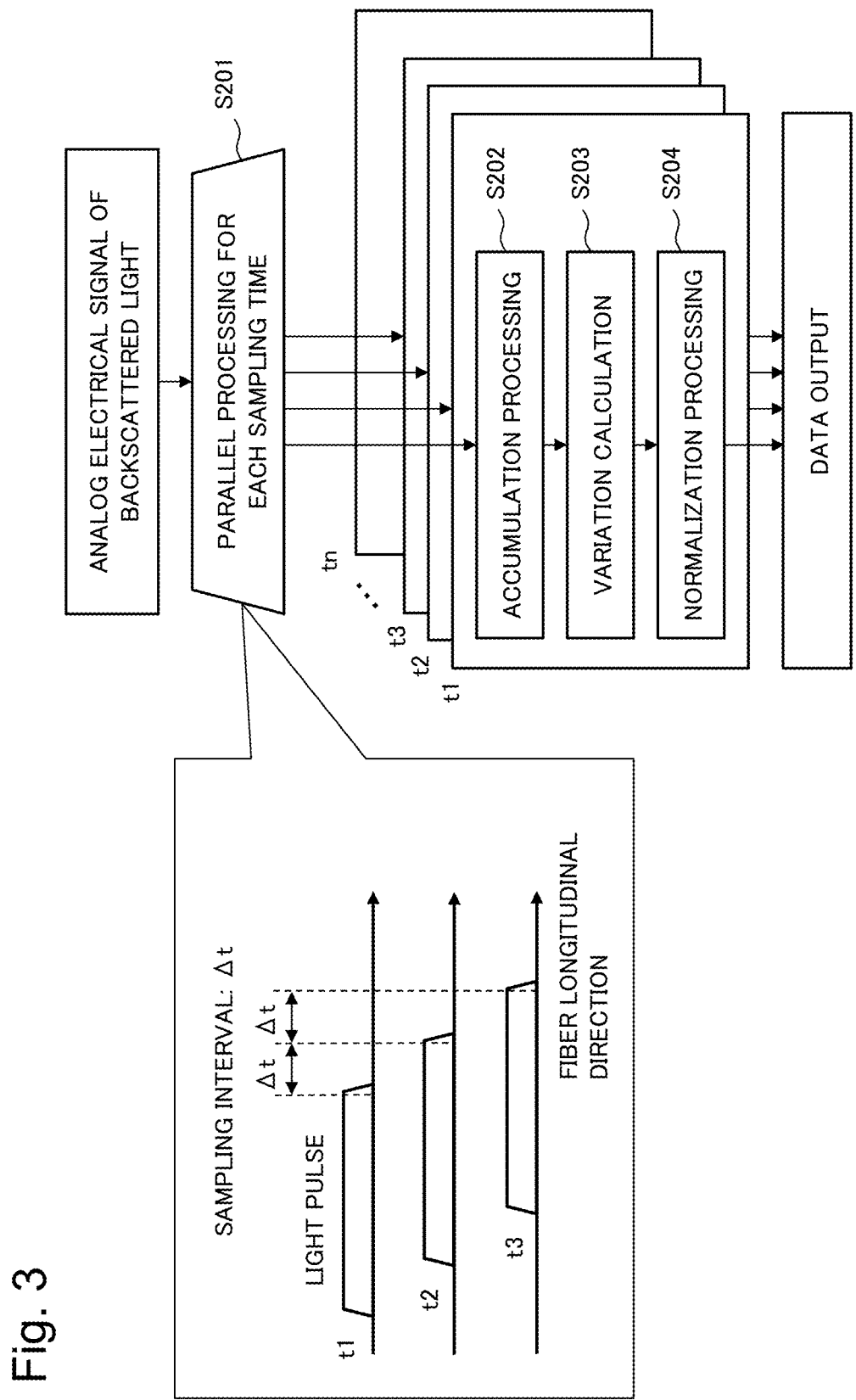
FIG. 3 is a diagram for explaining an operation of an analysis unit provided in the optical fiber sensor apparatus according to the second example embodiment of the present invention.

Next, a description will be given of an operation of the analysis unit 105 provided in the optical fiber sensor apparatus 100 according to the present example embodiment. FIG. 3 is a diagram for explaining the operation of the analysis unit 105 provided in the optical fiber sensor apparatus 100 according to the present example embodiment.

When the backscattered light from the optical fiber cable 1000 is input to the light receiving unit 107 via the circulator 103, the light detector 111 provided in the light receiving unit 107 converts this backscattered light into an analog electrical signal. The digital signal processing circuit 112 samples this analog electrical signal at a specific frequency, and converts this analog electrical signal into digital signals (sensor signals) for each sampling time (t1, t2, t3, . . . , tn−1, tn).

The parallel processing unit 115 provided in the vibration detection unit 113 performs the parallel processing for the input digital signals (sensor signals) for each sampling time (t1, t2, t3, . . . , tn−1, tn) (step S201). The cycle of the parallel processing is associated to a round trip time since the light pulse signal reaches the longest measuring point of the optical fiber cable 1000 until the light pulse signal returns. In other words, the time since the light pulse signal reaches the longest measuring point (distance that is associated to the sampling time tn) on the optical fiber cable 1000 after being sent from the sending unit 106 until the backscattered light of the light pulse signal returns therefrom to the light receiving unit 107 is the cycle of the parallel processing. Hence, the sensor signals based on the backscattered light that returns from the same position on the optical fiber cable 1000 are always processed on the same processing surface in the parallel processing.

Within a preset period of time, the accumulating unit 116 accumulates the sensor signals subjected to the parallel processing and input for each sampling time, and generates accumulated data (step S202).

Regarding the input accumulated data of each sampling time, the variation calculating unit 117 calculates the variations from the reference value (step S203).

The normalization processing unit 114 inputs the variations for each sampling time, and normalizes the variations within a predetermined time (step S204). Specifically, for example, the normalization processing unit 114 calculates a maximum value of the variations within the predetermined time, and executes the normalization by dividing each of the variations by this maximum value.

From a difference between the transmission time of the light pulse signal and the reception time of the backscattered light of the light pulse signal, the occurrence region estimating unit 118 estimates the region where the change in the environment of the optical fiber cable 1000 occurs.

Next, a description will be given of an operation of the normalization processing unit 114 by using FIGS. 4 and 5.

Figure 4:
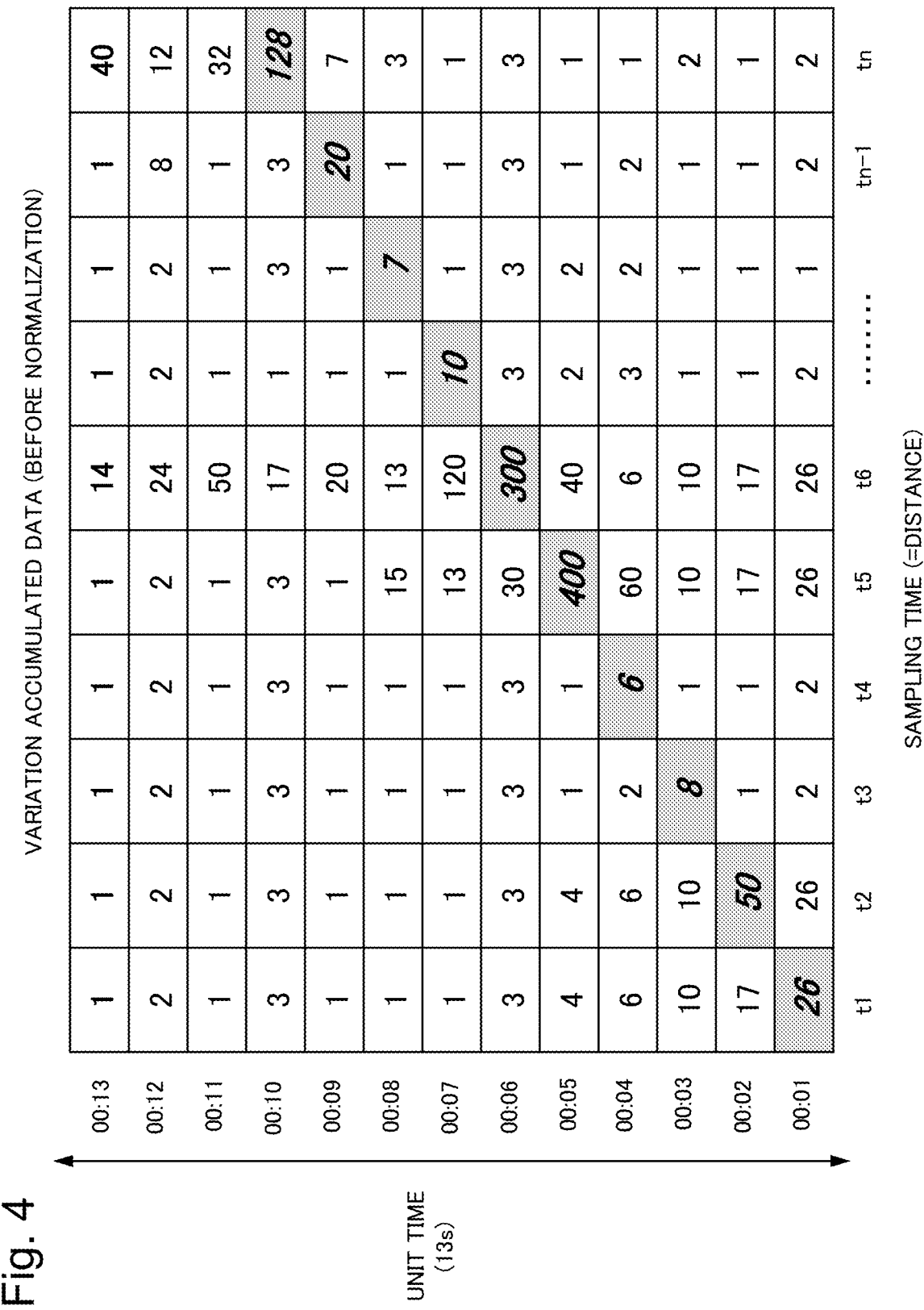
FIG. 4 is a diagram for explaining an operation of a normalization processing unit provided in an optical fiber sensor apparatus according to the second example embodiment of the present invention, and is a diagram illustrating an example of variation accumulated data before normalization processing.
Figure 5:
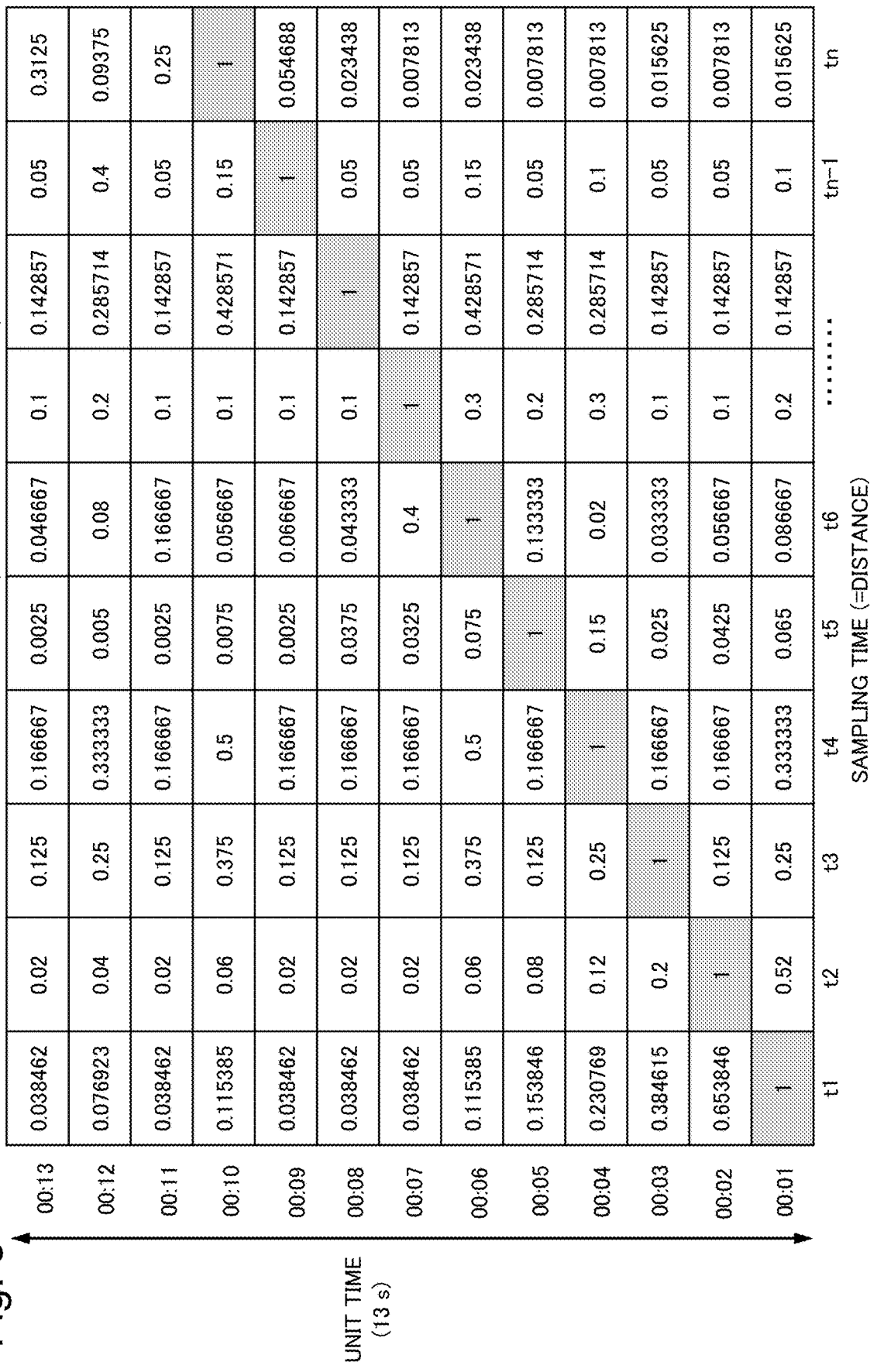
FIG. 5 is a diagram for explaining the operation of the normalization processing unit provided in the optical fiber sensor apparatus according to the second example embodiment of the present invention, and is a diagram illustrating an example of variation accumulated data after the normalization processing.

FIG. 4 illustrates an example of the variation accumulated data of the sensor signals before the normalization processing by the normalization processing unit 114. Moreover, FIG. 5 illustrates an example of the variation accumulated data of the sensor signals after the normalization processing by the normalization processing unit 114. Both of FIGS. 4 and 5 simulate results of sensing vibrations generated when a moving body (vehicle or the like) moves on a road on which the optical fiber cable 1000 is laid. In both of the drawings, horizontal axes indicate each sampling time within one sampling cycle, and vertical axes indicate each time within a predetermined time (13 seconds as a unit time in the examples of the drawings). A speed of the light pulse that propagates through the optical fiber cable 1000 is known, and accordingly, each sampling time indicated on the horizontal axes is synonymous with a distance from an incident end of the optical fiber cable 1000.

Each numeric value in both of the drawings indicates a magnitude of the variation of the sensor signal based on the backscattered light. Then, a larger value of the variation of the sensor signal based on the backscattered light means a larger strength of the vibration. This results from the following reason. In other words, when the strength of the vibration received by the optical fiber cable 1000 is large, an amount of distortion generated in the optical fiber cable 1000 increases by that much. Therefore, a change is given to the phase of the high frequency wave formed by modulating the light pulse signal serving as a source of the scattered light, and accordingly, the variation of the light intensity in the light receiving unit 107 increases, and this is the reason.

In the example illustrated in FIG. 4, large vibrations are observed at positions of the optical fiber cable 1000, which are associated to the sampling time t5 and the sampling time t6. Meanwhile, for example, at positions of the optical fiber cable 1000, which are associated to the sampling time t3 and the sampling time t4, values of the variations are small though the same moving body passes. Therefore, the intensities of the vibrations look weak. However, this is because the installation state of the optical fiber cable 1000 is poor at the positions of the optical fiber cable 1000, which are associated to the sampling time t3 and the sampling time t4, and this represents that a sensitivity of sensing vibrations is low.

For such a condition, the optical fiber sensor apparatus 100 according to the present example embodiment has a configuration in which the normalization processing unit 114 normalizes the variation within the unit time for each sampling time. Specifically, for example, the normalization processing unit 114 can be configured to calculate a maximum value of the variations within the unit time for each sampling time, and to perform the normalization by dividing each value of the variations by the calculated maximum value. FIG. 5 illustrates values of the accumulated data of the variations after normalization. By this normalization processing, all the maximum values of the variations of each sampling time become 1. Thus, fluctuations of the sensor signal intensities due to the installation state of the optical fiber cable 1000 can be suppressed. As a result, it becomes possible to clearly grasp the position of the moving body.

As mentioned above, in accordance with the optical fiber sensor apparatus 100 according to the present example embodiment, accurate measurement of the environmental change is enabled regardless of the situation where the optical fiber serving as a sensor is installed in the observation target.

Third Example Embodiment

Figure 6:
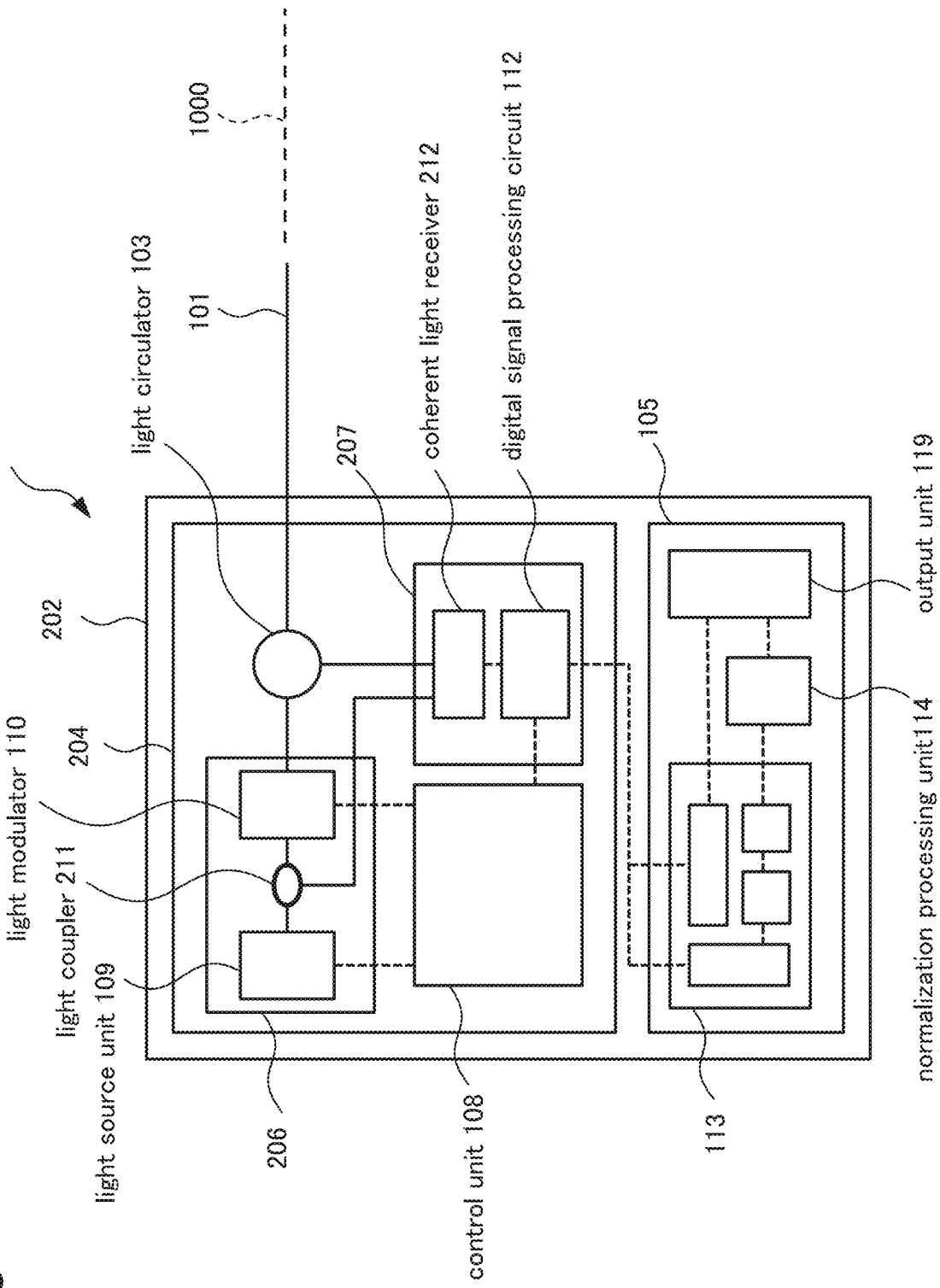
FIG. 6 is a block diagram illustrating a configuration of an optical fiber sensor apparatus according to a third example embodiment of the present invention.

Next, a third example embodiment of the present invention will be described. FIG. 6 illustrates a configuration of an optical fiber sensor apparatus 200 according to the present example embodiment. In the optical fiber sensor apparatus 200 according to the present example embodiment, a configuration of a sensor unit 204 provided in a device body 202 is different from the configuration of the optical fiber sensor apparatus 100 according to the first example embodiment. Other configurations are similar to the configurations of the optical fiber sensor apparatus 100 according to the first example embodiment, and accordingly, a detailed description of the other configurations will be omitted.

The sensor unit 204 includes a sending unit 206, a light receiving unit 207, a control unit 108, and a light circulator 103.

The sending unit 206 generates and sends a light pulse signal. In addition to a light source unit 109 and a light modulator 110, the sending unit 206 according to the present example embodiment includes a light coupler (light branching means) 211 in a light path between the light source unit 109 and the light modulator 110. Meanwhile, the light receiving unit 207 is configured to include a coherent light receiver (coherent light receiving means) 212 in place of the light detector 111 provided in the optical fiber sensor apparatus 200 according to the first example embodiment.

The light coupler (light branching means) 211 splits a light pulse sent from the light source unit 109. Then, the light coupler 211 sends the split light pulse as a part of the light pulse via the light path to the coherent light receiver 212 provided in the light receiving unit 207. Moreover, the light coupler 211 sends a light pulse other than the split light pulse to the light modulator 110.

The coherent light receiver (coherent light receiving means) 212 performs coherent detection for scattered light by causing the scattered light to interfere with the split light pulse, and converts the scattered light into an analog electrical signal. In accordance with the coherent detection system, backscattered light is subjected to processing adaptively for fluctuations of a phase and polarization in digital signal processing at a later stage, thus making it possible to measure the backscattered light with high sensitivity and low noise.

Two pieces of light, which are the light pulse from the light coupler 211 and backscattered light from the circulator 103, are input to the coherent light receiver 212. The sent light pulse causes a frequency shift by being subjected to intensity modulation at a high frequency wave by the audio-optical element of the light modulator 110, and accordingly, a frequency shift occurs also in the backscattered light. Therefore, two pieces of light, which are different in frequency from each other, are simultaneously input to the coherent light receiver 212. The coherent light receiver 212 observes a beat frequency component generated by interference between these two optical signals (the unmodulated light pulse and the modulated backscattered light) different in frequency from each other. In other words, the coherent light receiver 212 performs heterodyne detection. In this case, information about a phase of the high frequency wave formed by modulating the light pulse signal can be reproduced, and accordingly, it is also possible to sense a sound in an environment surrounding an optical fiber cable 1000.

The coherent light receiver 212 converts the beat frequency component into an analog electrical signal, and outputs the analog electrical signal to the digital signal processing circuit 112.

The control unit 108 synchronizes sending timing when the sending unit 206 sends the light pulse signal and detection timing when the light receiving unit 207 detects the backscattered light with each other.

A configuration and an operation of an analysis unit 105 provided in the device body 202 are as described in the second example embodiment.

In accordance with the optical fiber sensor apparatus 200 according to the present example embodiment, the coherent detection system is adopted for the light receiving unit 207, thus making it possible to observe the backscattered light with high sensitivity and low noise. As a result, in accordance with the optical fiber sensor apparatus 200 according to the present example embodiment, more accurate measurement of the environmental change is enabled regardless of the situation where the optical fiber serving as a sensor is installed in an observation target.

Fourth Example Embodiment

Figure 7:
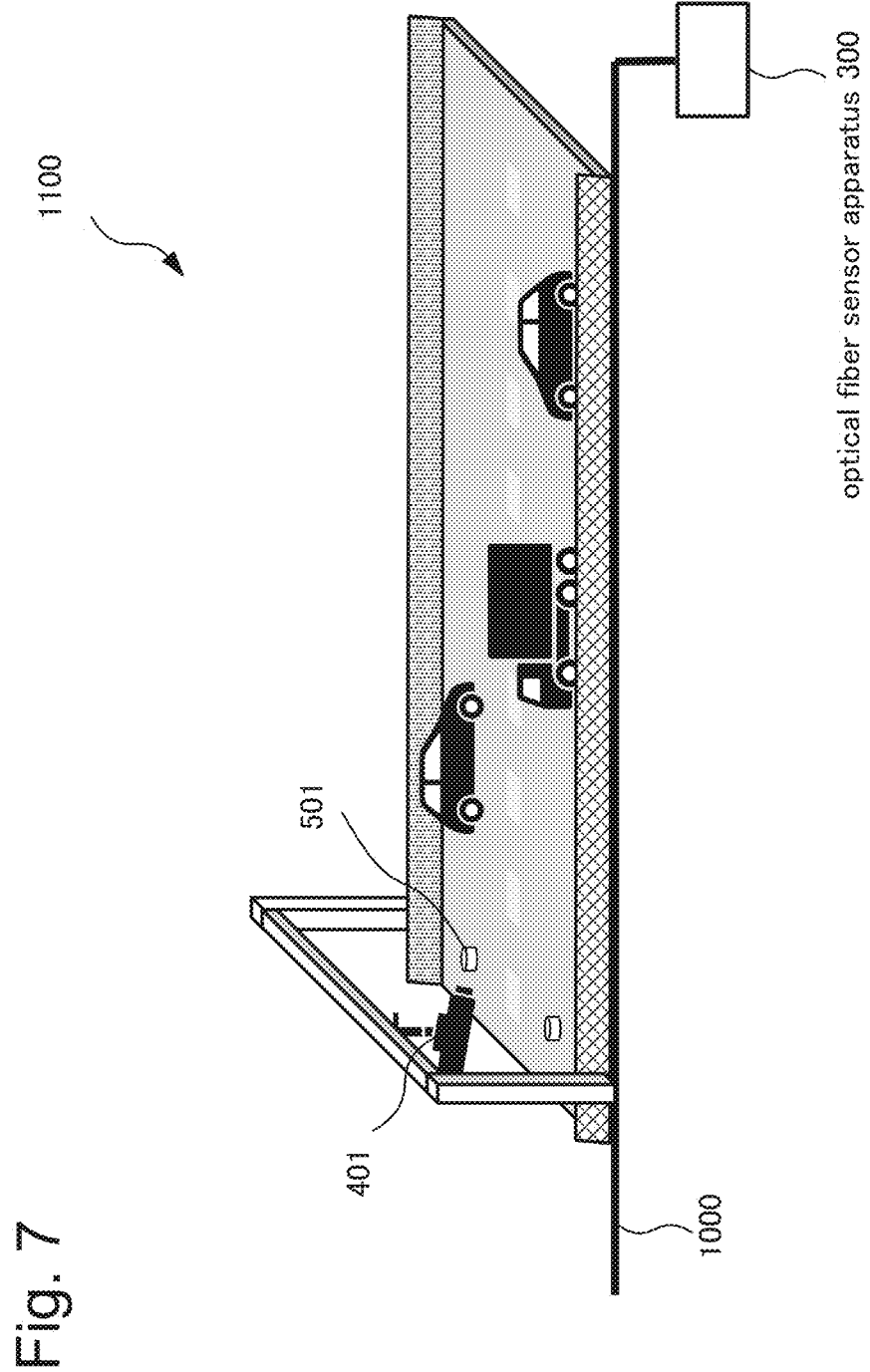
FIG. 7 is a diagram illustrating a configuration of a monitoring system according to a fourth example embodiment of the present invention.

Next, a fourth example embodiment of the present invention will be described. FIG. 7 illustrates a configuration of a monitoring system 1100 according to the present example embodiment. The monitoring system 1100 according to the present example embodiment includes an optical fiber sensor apparatus 300, an image information acquisition means, and a monitoring means (not illustrated).

As the optical fiber sensor apparatus 300, there can be used the optical fiber sensor apparatus 100 according to the second example embodiment or the optical fiber sensor apparatus 200 according to the third example embodiment. The optical fiber sensor apparatus 300 is used by being connected to an optical fiber cable 1000. FIG. 7 illustrates a case where the optical fiber cable 1000 is laid along a road such as a highway. As the optical fiber cable 1000, there may be used an optical fiber cable newly laid for the purpose of monitoring or an existing optical fiber cable for information communication.

The image information acquisition means acquires image information of an environment surrounding the optical fiber cable 1000. FIG. 7 illustrates a case where a monitoring camera 401 is provided as an example of the image information acquisition means.

The monitoring means monitors the environment surrounding the optical fiber cable 1000, based on a normalized inspection signal acquired from the optical fiber sensor apparatus 300 and the image information acquired from the image information acquisition means.

As illustrated in FIG. 7, the monitoring system 1100 can be configured to further include a vibration sensor 501 that senses (sensing) a vibration at a point position (point).

As described above, in accordance with the monitoring system 1100, a change of an environment such as a vibration and a sound which are generated by running of a vehicle is sensed, thus making it possible to monitor the surrounding environment. In particular, a highway is made by a long distance, and accordingly, it is difficult to monitor all places on the highway always and continuously by the monitoring camera 401 and the vibration sensor 501. However, the monitoring system 1100 according to the present example embodiment is configured to perform the monitoring in combination with the normalized inspection signal achieved from the optical fiber sensor apparatus 300 to be used by being connected to the optical fiber cable 1000 laid along the highway. Therefore, the monitoring system 1100 becomes capable of always and continuously monitoring all the places on the highway. In other words, the monitoring system 1100 can perform the monitoring by combining information achieved from the optical fiber sensor apparatus 300 that senses a vibration and a sound caused by movement of a car on the highway and information achieved from the existing monitoring system of the highway, such as the monitoring camera 401 and the point sensing-type vibration sensor 501. As a result, the monitoring system 1100 becomes capable of monitoring a continuous movement of the car on the highway. Thus, the monitoring system 1100 can be used as a traffic monitor for sensing an occurrence of congestion, sensing wrong-way driving, and the like.

The optical fiber sensor apparatus 300 can set an accumulation time of sensor signals in an accumulating unit 116 to, for example, 24 hours, where the sensor signals are based on backscattered light. Then, a normalization processing unit 114 can be configured to calculate a maximum value of variations for each sampling frequency with regard to accumulated data acquired in the 24 hours, and to standardize the variations by using the maximum value. The normalization processing performed by the normalization processing unit 114 as described above does not necessarily need to be performed every day, and is only required to be periodically performed. When weather conditions differ, it is desirable to perform the normalization processing according to the weather conditions.

Figure 8:
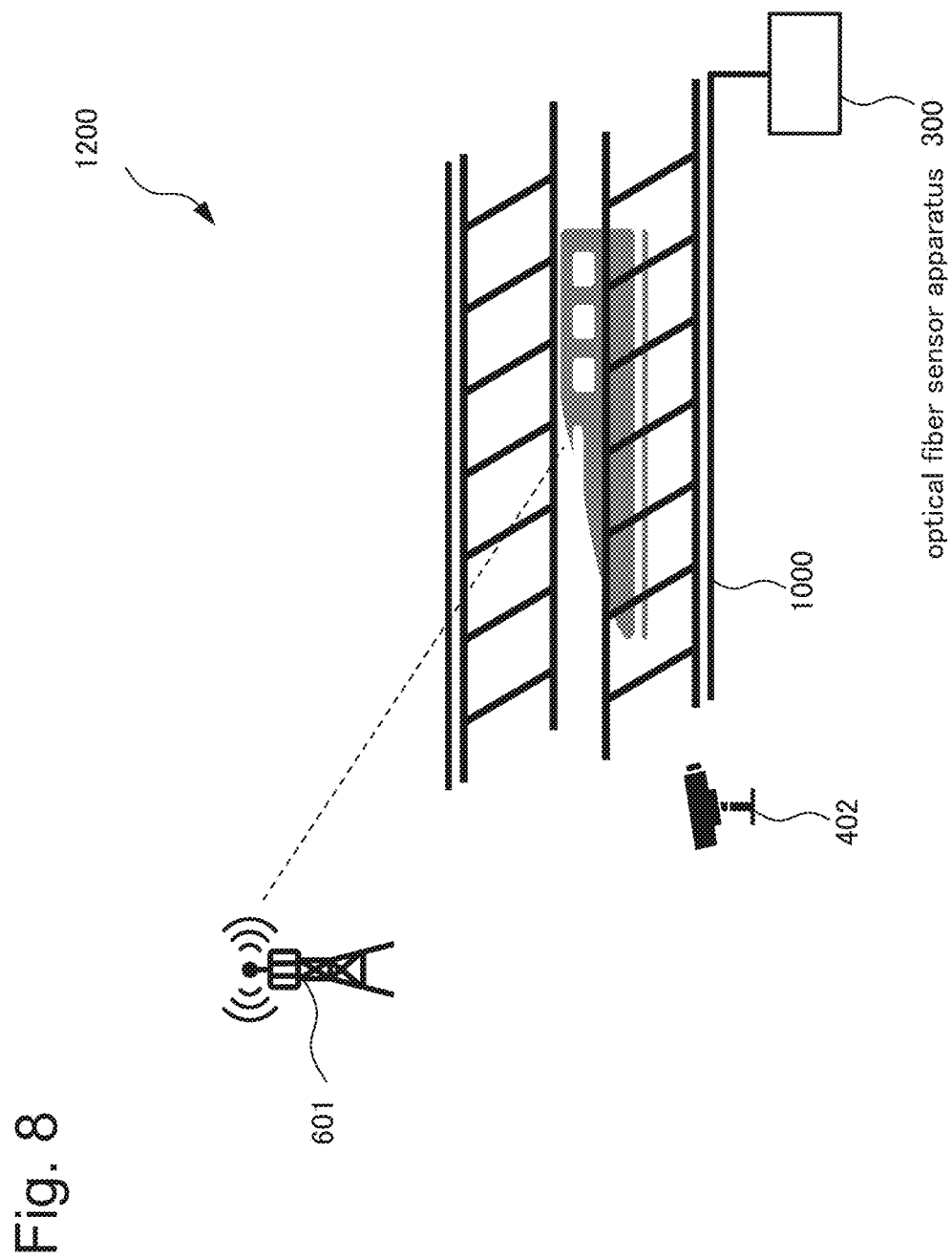
FIG. 8 is a diagram illustrating another configuration of the monitoring system according to the fourth example embodiment of the present invention.

FIG. 8 illustrates another configuration of the monitoring system according to the present example embodiment. A monitoring system 1200 illustrated in FIG. 8 includes the optical fiber sensor apparatus 300 to be used by being connected to the optical fiber cable 1000 laid along a railroad, and a monitoring camera 402 as the image information acquisition means. In this case also, as the optical fiber cable 1000, there may be used an optical fiber cable newly laid for the purpose of monitoring or an existing optical fiber cable for information communication.

As illustrated in FIG. 8, the monitoring system 1200 can be configured to further include, for example, a wireless train position sensor 601. In other words, the monitoring system 1200 can be used together with a train operation monitoring system including a track circuit and the wireless train position sensor 601.

A railroad on which a train runs is made by a long distance, and in some cases, a radio signal cannot reach the train depending on a place such as a mountain tunnel. Therefore, it is difficult to always monitor all railroads by the existing monitoring camera 402 and the wireless train position sensor 601. However, as mentioned above, the optical fiber sensor apparatus 300 is capable of sensing the change of the environment such as a vibration and a sound which are generated by the running of the train, along the railroad, and accordingly, can complement the existing monitoring system. In other words, the monitoring system 1200 can perform the monitoring by combining information achieved from the optical fiber sensor apparatus 300 that senses a vibration and a sound caused by the movement of the train and information achieved from the existing train operation monitoring system. As a result, the monitoring system 1200 becomes capable of continuously monitoring the movement of the train with higher accuracy.

FIG. 9 illustrates still another configuration of the monitoring system according to the present example embodiment. A monitoring system 1300 illustrated in FIG. 9 includes the optical fiber sensor apparatus 300 to be used by being connected to the optical fiber cable 1000 laid in a building, and a monitoring camera 403 as the image information acquisition means. FIG. 9 illustrates an example of a case where the optical fiber cable 1000 is installed along an aisle under a floor in a building such as a data center. In this case also, as the optical fiber cable 1000, there may be used an optical fiber cable newly laid for the purpose of monitoring or an existing optical fiber cable for information communication in the data center.

In the data center or the like as an example of the building, many visitors enter and leave a server room and the like. The entering and leaving of persons to and from the server room are managed by an access control system or the like, and movements of persons in the server room are tracked by monitoring cameras. In that case, in order to monitor the movements of the persons in all the aisles in the server room, a large number of monitoring cameras are required, and an expense for the monitoring cameras becomes enormous.

In contrast, in accordance with the monitoring system 1300 according to the present example embodiment, by the optical fiber sensor apparatus 300, it is possible to sense, along the aisle, the change of the environment such as a vibration and a sound which are generated by persons walking. In other words, the monitoring system 1300 can perform the monitoring by combining information achieved from the optical fiber sensor apparatus 300 that senses a vibration and a sound caused by the persons' walking in the server room and image information achieved from the monitoring camera 403. As a result, even when the number of monitoring cameras is set to a small number, the monitoring system 1300 becomes capable of performing tracking (tracing) of the persons' movements by walking continuously with high accuracy.

The observation target is not limited to the above-mentioned moving body such as the car, the train, and the person, and for example, the monitoring system according to the present example embodiment can also be used in order to monitor a degraded state of a pier portion and the like from a change of a vibration state in vibration data of the pier portion and the like.

The whole or part of the example embodiments disclosed above can be described as, but not limited to, the following supplementary notes.

Supplementary Note 1

A sensor signal processing apparatus, comprising: variation calculation means for receiving a sensor signal based on scattered light of a light pulse propagating through an optical fiber, and calculating a variation of the sensor signal from a reference value; and normalization processing means for normalizing the variation within a predetermined time, and calculating a normalized variation.

Supplementary Note 2

The sensor signal processing apparatus according to supplementary note 1, further comprising occurrence region estimation means for estimating a region in which an environmental change of the optical fiber occurs, from a difference between a transmission time of the light pulse and a reception time of scattered light of the light pulse.

Supplementary Note 3

The sensor signal processing apparatus according to supplementary note 1 or 2, wherein the normalization processing means normalizes the variation by dividing the variation by a maximum value of the variation within the predetermined time.

Supplementary Note 4

The sensor signal processing apparatus according to supplementary note 1 or 2, wherein the normalization processing means normalizes the variation by dividing the variation by an average value of the variation within the predetermined time.

Supplementary Note 5

The sensor signal processing apparatus according to any one of supplementary notes 1 to 4, wherein the sensor signal is a signal based on the scattered light when the optical fiber is laid along a road.

Supplementary Note 6

The sensor signal processing apparatus according to any one of supplementary notes 1 to 4, wherein the sensor signal is a signal based on the scattered light when the optical fiber is laid along a railroad.

Supplementary Note 7

The sensor signal processing apparatus according to any one of supplementary notes 1 to 4, wherein the sensor signal is a signal based on the scattered light when the optical fiber is laid in a building.

Supplementary Note 8

An optical fiber sensor apparatus, comprising: the sensor signal processing apparatus according to any one of supplementary notes 1 to 7; light sending means for generating the light pulse and sending the light pulse to the optical fiber; and light reception processing means for receiving the scattered light and generating the sensor signal, based on the scattered light.

Supplementary Note 9

The optical fiber sensor apparatus according to supplementary note 8, wherein the light reception processing means includes light detection means for converting the scattered light into an analog electrical signal, and digital signal processing means for converting the analog electrical signal into a digital signal and generating the sensor signal.

Supplementary Note 10

The optical fiber sensor apparatus according to supplementary note 8, wherein the light sending means includes light branching means, the light branching means splits the light pulse and sends, to the light reception processing means, a split light pulse of a part of the light pulse, and the light reception processing means includes coherent light receiving means for performing coherent detection on the scattered light by causing the scattered light to interfere with the split light pulse, and converting the scattered light into an analog electrical signal, and digital signal processing means for converting the analog electrical signal into a digital signal and generating the sensor signal.

Supplementary Note 11

A monitoring system, comprising: the optical fiber sensor apparatus according to any one of supplementary notes 8 to 10; image information acquisition means for acquiring image information on a surrounding environment of the optical fiber; and monitoring means for monitoring the surrounding environment, based on the normalized inspection signal and the image information.

Supplementary Note 12

A sensor signal processing method, comprising: receiving a sensor signal based on scattered light of a light pulse propagating through an optical fiber, and calculating a variation of the sensor signal from a reference value; and normalizing the variation within a predetermined time, and calculating a normalized variation.

Supplementary Note 13

The sensor signal processing method according to supplementary note 12, further comprising estimating a region in which an environmental change of the optical fiber occurs, from a difference between a transmission time of the light pulse and a reception time of scattered light of the light pulse.

Supplementary Note 14

The sensor signal processing method according to supplementary note 12 or 13, wherein the calculating of the normalized variation includes normalizing the variation by dividing the variation by a maximum value of the variation within the predetermined time.

Supplementary Note 15

The sensor signal processing method according to supplementary note 12 or 13, wherein the calculating of the normalized variation includes normalizing the variation by dividing the variation by an average value of the variation within the predetermined time.

Supplementary Note 16

A computer-readable recording medium recording a program for causing a computer to function as: variation calculation means for receiving a sensor signal based on scattered light of a light pulse propagating through an optical fiber, and calculating a variation of the sensor signal from a reference value; and normalization processing means for normalizing the variation within a predetermined time, and calculating a normalized variation.

Supplementary Note 17

The computer-readable recording medium according to supplementary note 16, recording a program for further causing the computer to function as occurrence region estimation means for estimating a region in which an environmental change of the optical fiber occurs, from a difference between a transmission time of the light pulse and a reception time of scattered light of the light pulse.

Supplementary Note 18

The computer-readable recording medium according to supplementary note 16 or 17, wherein the normalization processing means executes one of a processing for normalizing the variation by dividing the variation by a maximum value of the variation within the predetermined time and a processing for normalizing the variation by dividing the variation by an average value of the variations within the predetermined time.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST

10 Sensor signal processing apparatus
11 Variation calculation means
12 Normalization processing means
100, 200, 300 Optical fiber sensor apparatus
101 Optical fiber
102, 202 Device body 103 Light circulator
104, 204 Sensor unit
105 Analysis unit
106, 206 Sending unit
107, 207 Light receiving unit
108 Control unit
109 Light source unit
110 Light modulator
111 Light detector
112 Digital signal processing circuit
113 Vibration detection unit
114 Normalization processing unit
115 Parallel processing unit
116 Accumulating unit
117 Variation calculating unit
118 Occurrence region estimating unit
119 Output unit
211 Light coupler
212 Coherent light receiver
401, 402, 403 Monitoring camera
501 Vibration sensor
601 Train position sensor
1000 Optical fiber cable
1100, 1200, 1300 Monitoring system

The invention claimed is:

1. An optical fiber sensor apparatus, comprising:
a sensor signal processing apparatus comprising one or more memories storing instructions and one or more processors configured to execute the instructions to:
receive a sensor signal using scattered light of a light pulse propagating through an optical fiber, and calculate a variation of the sensor signal from a reference value; and
normalize the variation within a predetermined period time, and calculate a normalized variation;
a light sending circuit configured to generate the light pulse and send the light pulse to the optical fiber; and
a light reception processing circuit configured to receive the scattered light and generate the sensor signal, using the scattered light,
wherein the light sending circuit comprises a light coupler,
wherein the light coupler is configured to split the light pulse and to send, to the light reception processing circuit, a split light pulse of a part of the light pulse,
wherein the light reception processing circuit comprises:
a coherent light receiver configured to perform coherent detection on the scattered light by causing the scattered light to interfere with the split light pulse, and convert the scattered light into an analog electrical signal; and
a digital signal processing circuit configured to convert the analog electrical signal into a digital signal and generate the sensor signal.

2. The optical fiber sensor apparatus according to claim 1, wherein the one or more processors included in the sensor signal processing apparatus are configured to execute the instructions to estimate a region in which an environmental change of the optical fiber occurs, from a difference between a transmission time of the light pulse and a reception time of scattered light of the light pulse.

3. The optical fiber sensor apparatus according to claim 1, wherein the one or more processors included in the sensor signal processing apparatus are configured to execute the instructions to normalize the variation by dividing the variation by a maximum value of the variation within the predetermined period of time.

4. The optical fiber sensor apparatus according to claim 1, wherein the one or more processors included in the sensor signal processing apparatus are configured to execute the instructions to normalize the variation by dividing the variation by an average value of the variation within the predetermined period of time.

5. The optical fiber sensor apparatus according to claim 1, wherein the sensor signal is a signal using the scattered light when the optical fiber is laid along a road.

6. A sensor signal processing method for a sensor signal processing apparatus comprising an optical fiber sensor apparatus, the method comprising:
receiving a sensor signal using scattered light of a light pulse propagating through an optical fiber, and calculating a variation of the sensor signal from a reference value; and
normalizing the variation within a predetermined period of time, and calculating a normalized variation,
wherein the optical fiber sensor apparatus comprises:
the sensor signal processing apparatus;
a light sending circuit configured to generate the light pulse and send the light pulse to the optical fiber; and
a light reception processing circuit configured to receive the scattered light and generate the sensor signal, using on the scattered light, and
wherein the light sending circuit comprises a light coupler,
wherein the light coupler splits the light pulse and sends, to the light reception processing circuit, a split light pulse of a part of the light pulse, and
wherein the light reception processing circuit comprises:
a coherent light receiver configured to perform coherent detection on the scattered light by causing the scattered light to interfere with the split light pulse, and convert the scattered light into an analog electrical signal; and
a digital signal processing circuit configured to convert the analog electrical signal into a digital signal and generate the sensor signal.

7. The sensor signal processing method according to claim 6, further comprising:
estimating a region in which an environmental change of the optical fiber occurs, from a difference between a transmission time of the light pulse and a reception time of scattered light of the light pulse.

8. The sensor signal processing method according to claim 6, wherein the calculating of the normalized variation comprises normalizing the variation by dividing the variation by a maximum value of the variation within the predetermined period of time.

9. The sensor signal processing method according to claim 6, wherein the calculating of the normalized variation comprises normalizing the variation by dividing the variation by an average value of the variation within the predetermined period of time.

* * * * *